(12) United States Patent
Oh et al.

(10) Patent No.: US 12,277,006 B2
(45) Date of Patent: Apr. 15, 2025

(54) HALO DISPLAY WITH DIAGONAL RACK GEAR AND DUAL LENTICULAR SURFACE

(71) Applicant: Dell Products L.P., Round Rock, TX (US)

(72) Inventors: Guentaek Oh, Singapore (SG); KyungEun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 17/863,626

(22) Filed: Jul. 13, 2022

(65) Prior Publication Data

US 2024/0019895 A1    Jan. 18, 2024

(51) Int. Cl.
| | |
|---|---|
| *F21V 14/04* | (2006.01) |
| *F21V 7/04* | (2006.01) |
| *F21V 7/05* | (2006.01) |
| *F21V 8/00* | (2006.01) |
| *F21V 33/00* | (2006.01) |
| *G06F 1/16* | (2006.01) |

(52) U.S. Cl.
CPC ............ *G06F 1/1624* (2013.01); *F21V 7/048* (2013.01); *F21V 7/05* (2013.01); *F21V 14/04* (2013.01); *F21V 33/0052* (2013.01); *G02B 6/0033* (2013.01); *G02B 6/0078* (2013.01); *G02B 6/0088* (2013.01)

(58) Field of Classification Search
CPC . F21V 7/048; F21V 7/05; F21V 14/04; G02F 1/133605
See application file for complete search history.

(56) References Cited

U.S. PATENT DOCUMENTS

| | | | |
|---|---|---|---|
| 2010/0246186 A1* | 9/2010 | Chang | ................... F21V 14/04 362/310 |
| 2017/0148393 A1 | 5/2017 | Peana | |
| 2021/0041085 A1* | 2/2021 | Oh | ....................... F21V 7/0008 |

* cited by examiner

*Primary Examiner* — Sean P Gramling
(74) *Attorney, Agent, or Firm* — Larson Newman, LLP (57) ABSTRACT

A display for an information handling system includes a front panel, a rear portion, and multiple halos. The halos are located in between the front panel and the rear portion, and each of the halos transition between a closed position and an open position. The first halo includes a dual lenticular surface and a main portion. The dual lenticular surface directs a bias light along the first halo. The main portion is in physical communication with the dual lenticular surface. The main portion receives the bias lighting from the dual lenticular surface, and reflects the bias lighting toward a front of the display.

18 Claims, 9 Drawing Sheets

HALO DISPLAY WITH DIAGONAL RACK GEAR AND DUAL LENTICULAR SURFACE

FIELD OF THE DISCLOSURE

The present disclosure generally relates to information handling systems, and more particularly relates to a halo display with diagonal rack gear and dual lenticular surface.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a front panel, a rear portion, and multiple halos. The halos are located in between the front panel and the rear portion, and each of the halos may transition between a closed position and an open position. The first halo includes a dual lenticular surface and a main portion. The dual lenticular surface may direct a bias light along the first halo. The main portion is in physical communication with the dual lenticular surface. The main portion may receive the bias lighting from the dual lenticular surface, and reflect the bias lighting toward a front of the display.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
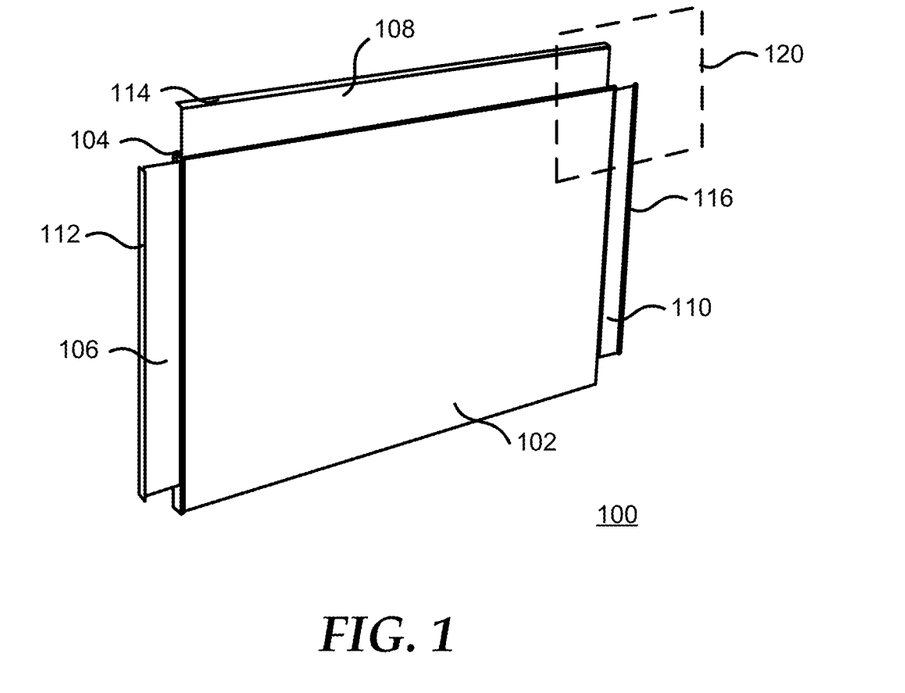
FIG. 1 is a diagram of a display of an information handling system according to at least one embodiment of the present disclosure.

FIG. 1 is a diagram of a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102, a rear cover 104, and halos 106, 108, and 110. Halo 106 includes a top portion 112, halo 108 includes a top portion 114, and halo 110 includes a top portion 116. Halos 106, 108, and 110 are integrated between front panel 102 and rear cover 104, and each of the halos may slide between a closed position and an open position as will be described herein. In certain examples, each of halos 106, 108, and 110 may be any other type of baffle that captures and redirects an output of bias lighting. Using the described halos 106, 108, and 110 provides a predictable medium by which bias lighting may be provided and for which bias lighting for a particular type of display can be specially configured. A portion 120 of display 100 will be described with respect to FIG. 2 below.

Figure 2:
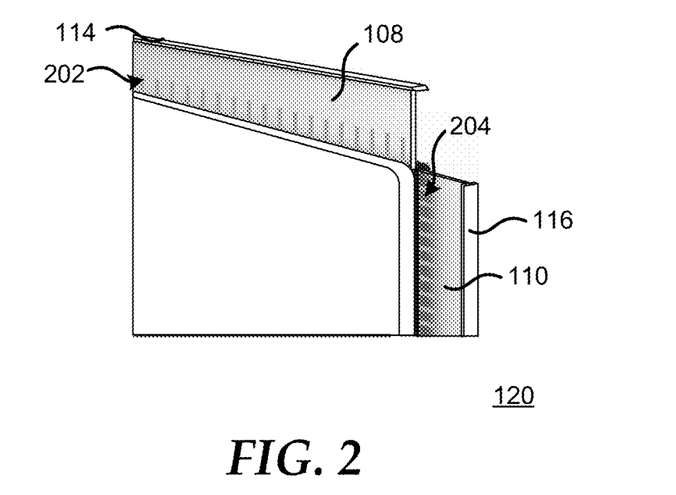
FIG. 2 is a diagram of a portion of a display of an information handling system according to at least one embodiment of the present disclosure.

FIG. 2 illustrates portion 120 of display 100 according to at least one embodiment of the present disclosure. Halo 108 includes a dual lenticular surface 202, and halo 110 includes a dual lenticular surface 204. Dual lenticular surface 202 may direct bias lighting along halo 108, such that the bias lighting may be presented to a user of display via the surface of the halo. Similarly, dual lenticular surface 204 may direct bias lighting along halo 110, such that the bias lighting may be presented to a user of display via the surface of the halo. In an example, top portion 114 of halo 108 may prevent the bias lighting from shining above the halo. Similarly, top portion 116 of halo 110 may prevent the bias lighting from shining beyond the halo. Top portions 114 and 116 may be utilized in additional manners as will be described below. In an example, halos 108 and 110 may include any suitable reflective surface to reflect the bias lighting. For example, halos 108 and 110 may be white or gray, which in turn may enable the bias lighting to reflect off the halos. In another example, halos 108 and 110 may include a reflector sheet to reflect the bias lighting. While not shown in FIG. 2, halo 106 of FIG. 1 may have a similar dual lenticular surface as compared to dual lenticular surfaces 202 and 204 to direct bias lighting along the halo, and halo 106 may include a similar reflective surface as described with respect to halos 108 and 110.

Figure 3:
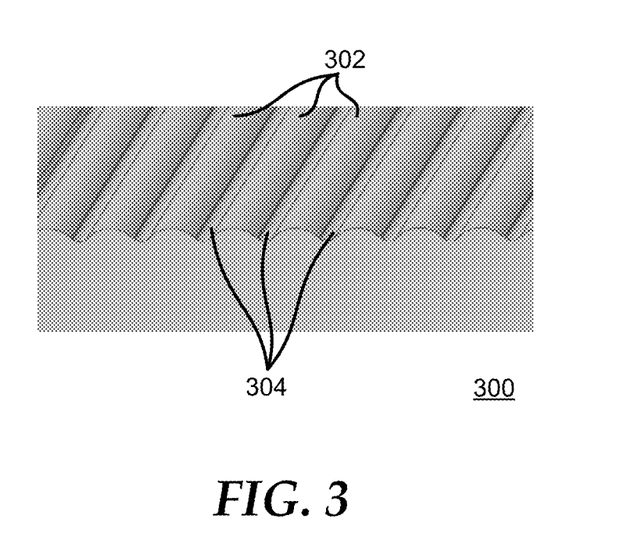
FIG. 3 is a diagram of a portion of dual lenticular surface treatment of an information handling system according to at least one embodiment of the present disclosure.

FIG. 3 illustrates a portion of a dual lenticular surface 300 according to at least one embodiment of the present disclosure. Dual lenticular surface 300 may be located on each of halos 106, 108, and 110 of FIG. 1. Dual lenticular surface 300 may be substantially similar to dual lenticular surfaces 202 and 204 of FIG. 2. Dual lenticular surface 300 includes multiple convex rows 302 and multiple channels 304. As shown in FIG. 3, each channel 304 may be located in between different pairs of convex rows 302.

In an example, convex rows 302 and channels 304 may be used to transmit bias lighting along dual lenticular surface 300 and a corresponding halo, such as halo 106, 108, or 110 of FIG. 1. In certain examples, convex rows 304 and channels 304 may be formed on a halo in any suitable manner. For example, dual lenticular surface 300 may be applied as a surface treatment on halos 106, 108, and 110 of FIG. 1. In an example, convex rows 302 of dual lenticular surface 300 may focus the bias lighting into a beam along a corresponding halo, such that less of the bias lighting to escape. In this example, the apparent brightness of the bias lighting on a halo is increased.

Figure 4:
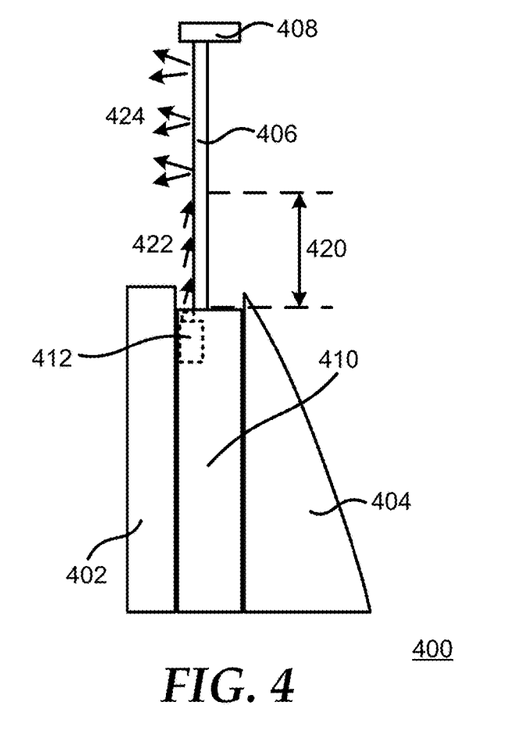
FIGS. 4-6 are diagrams of a portion of a display with a halo portion in different positions according to at least one embodiment of the present disclosure.
Figure 5:
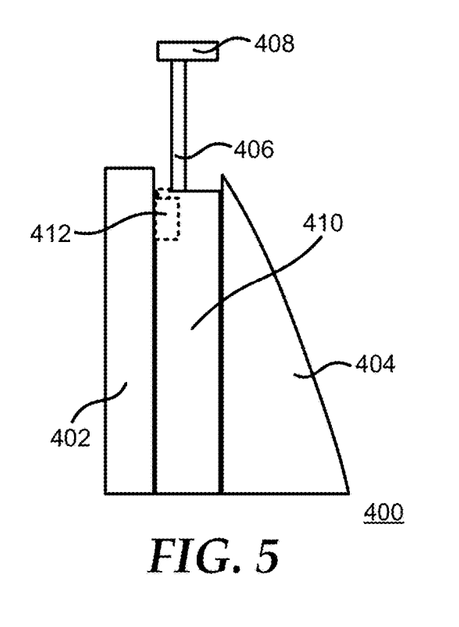
Figure 6:
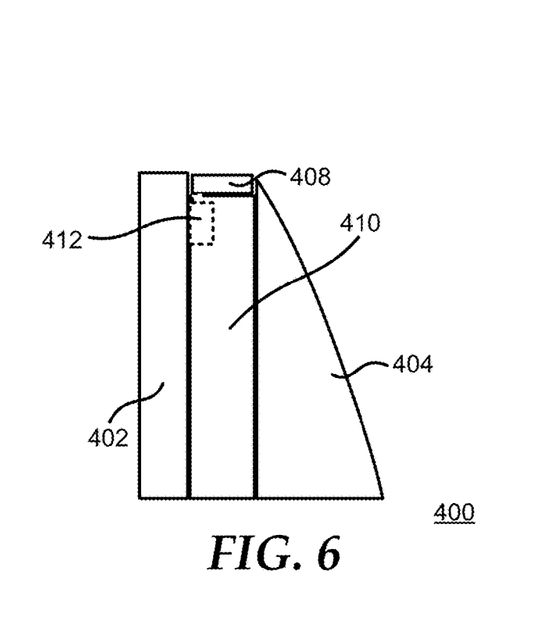

FIGS. 4-6 illustrate a portion of a display 400 with a halo in different positions according to at least one embodiment of the present disclosure. Display 400 may be substantially similar to display 100 of FIG. 1. Display 400 includes a front panel 402, a rear cover 404, a halo 406, a top portion 408, a top portion 410, and a light emitting diode (LED) 412. While only a single LED 412 is illustrated, display 400 may include any suitable number of LEDs to project bias lighting on the halos, such as halos 106, 108, and 100 of FIG. 1. In certain examples, multiple LEDs 412 may be utilized along each side of display 400 to project the bias lighting along each of the edges of the display 400. In an example, halo 406 may include a reflective surface that may further promote more efficient redirection of the full output of LED 412.

Referring now to FIG. 4, halo 406 is in an open position. In the open position, halo 406 is extended from display 400 such that a dual lenticular surface 420 of the halo is beyond front panel 402. In an example, dual lenticular surface 420 enables light from LED 412 to travel along halo 406 in the direction of arrows 422. After the bias light from LED 412 travels beyond dual lenticular portion 420, the light may be projected in the direction of arrows 424. In an example, an output of a screen in front panel 402 may be projected towards a user facing the display 400 and bias lighting may be generated via LEDs 412. In this example, bias lighting from LED 412 may be directed towards the user via halo 406. Halo 406 may serve as a baffle that redirects the bias light from LED 412 in the direction of arrows 424.

Referring now to FIG. 5, halo 406 is in an intermediate position. While in the intermediate position, halo 406 may be extended any suitable length from the top edges of front panel 402 and rear cover 404. In an example, dual lenticular surface 420, shown in FIG. 4, may not be visible by a user of display 400.

Referring now to FIG. 6, halo 406 is in a closed position. In an example, while in the closed position, top portion 408 of halo 406 may be substantially flush with a top edge of front panel 402 and a top edge of rear cover 404. Similarly, when a halo corresponding to top portion 410 is in a closed position, the top portion 410 is substantially flush with a side edge of front panel 402 and a side edge of rear portion 404. In this example, the top portion of each halo, such as top portions 408 and 410 In FIG. 6, may form a substantially flush and continuous surface from front panel 402 to rear portion 404. The continuous surface formed by top portion of each halo may enable display 400 to appear as one complete and unbroken unit.

Figure 7:
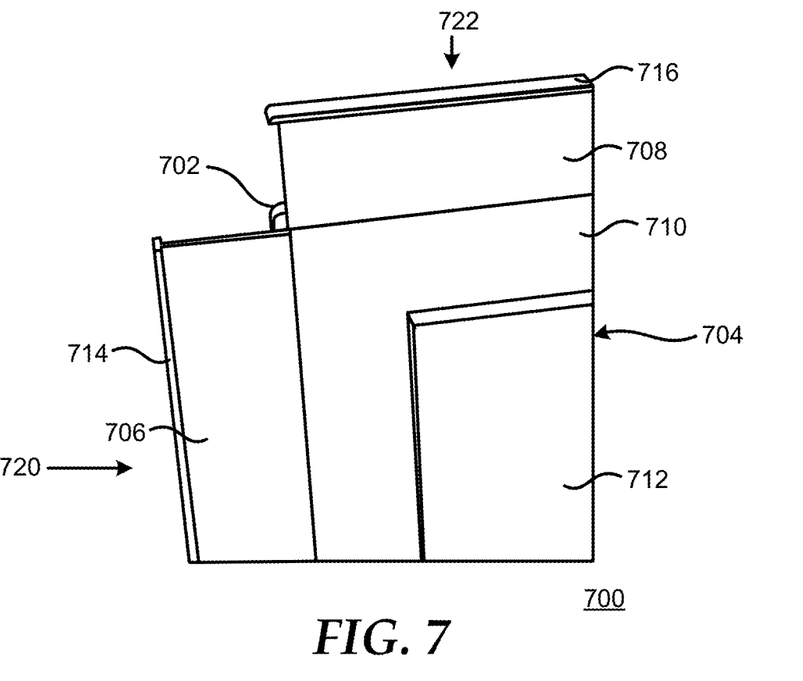
FIGS. 7-9 are diagrams of a portion of a display with multiple halo portions in different positions according to at least one embodiment of the present disclosure.
Figure 8:
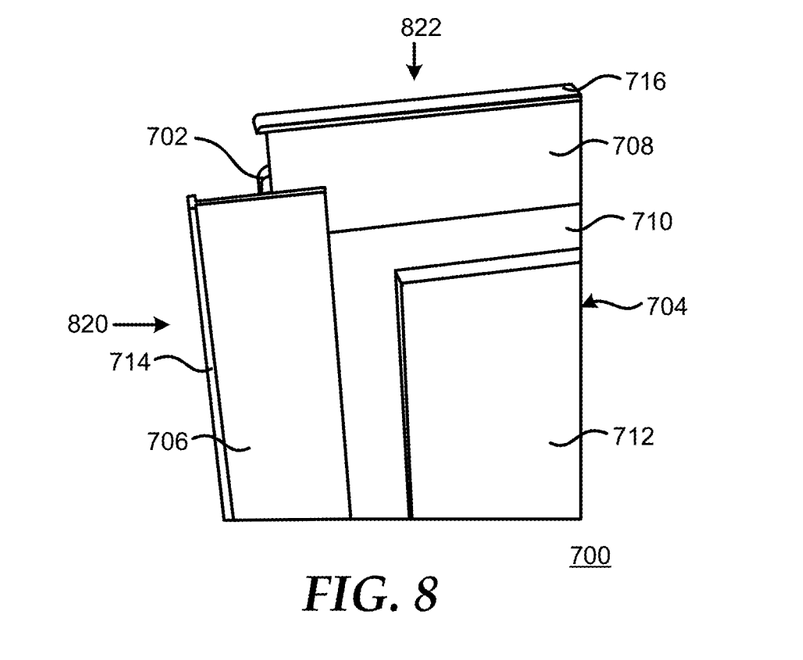
Figure 9:
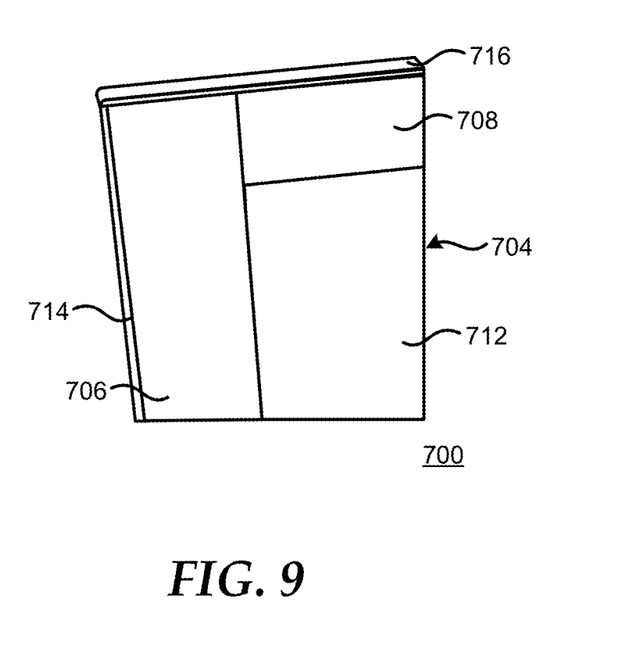

FIGS. 7-9 illustrate a portion of a display 700 with according to at least one embodiment of the present disclosure. Display 700 includes a front panel 702, a rear portion 704, and halos 706 and 708. In FIGS. 7-9, a back surface of rear portion 704 has been removed or cut-away to illustrate internal features of the rear portion and positioning of halos 706 and 708 within the rear portion. Display 700 may be substantially similar to display 100 of FIG. 1. While only two halos 706 and 708 have been shown with respect to FIGS. 7-9, one of ordinary skill in the art will recognize that the operations and descriptions for halos 706 and 708 may apply to halos 106, 1 108, and 110 of FIG. 1. Rear portion 704 includes a main portion 710 and a raised or stop portion 712. Halo 706 includes a top portion 714 and halo 708 includes a top portion 716.

Referring to FIG. 7, halos 706 and 708 are is an open position, such that the halos are fully extended with respect to front panel 702 and rear portion 704. In an example, halo 706 and 708 may be mechanically coupled via gears and other structures such that movement of one of the halos may automatically move the other halo, as will be further described with respect to FIGS. 10-15 below. In response to a force being exerted on halo 706 in the direction of arrow 720 may cause portions of the halo to move within display 700 in the direction of arrow 720. Based on the mechanical coupling between halos 706 and 708, the movement of halo 706 in the direction of arrow 720 may also cause halo 708 to move in the direction of arrow 722. In an example the movement of halo 708 in the direction of arrow 722 may result in portions of the halo to move within display 700. While the movement of halos 706 and 708 are described with respect to a movement of halo 706 may cause halo 708 to move, the opposite may also occur without varying from the scope of this disclosure. For example, a movement of halo 708 may cause halo 706 to move.

Referring to FIG. 8, halos 706 and 708 are in an intermediate position, such that the halos are at any suitable location between the open position and a closed position. In an example, while halo 706 is moving or sliding in the direction of arrow 820, halo 708 may also be moving or sliding in the direction of arrow 822. Based on the movement of halos 706 and 708, the halos may overlap each other. For example, halo 706 may be located closer to a back surface of rear portion 704 and halo 708 may be located closer to front panel 402, as shown in FIG. 8. In this example, a first surface of halo 708 may slide in physical communication with or near main portion 710 and a first surface of halo 706 may slide in physical communication with or near second surface of halo 708 which may be an opposite surface with respect to the first surface of halo 708. One of ordinary skill in the art would recognize that the positions of halos 706 and 708 with respect to front panel 702 and the back surface of rear portion 704 may be switched without varying from the scope of this disclosure.

Referring to FIG. 9, halos 706 and 708 are in a closed position. While in the closed position, halos 706 and 708 are both in physical communication with raised or stop portion 712 of rear portion 704. Additionally, halos 706 and 708 may be in an overlap position, such that halo 706 may be located closer to a back surface of rear portion 704 and halo 708 may be located closer to front panel 402. Also, while halos 706 and 708 are in the closed position, top portion 716 of halo 708 may overlap top portion 714 of halo 706. In an example, top portion 716 overlapping top portion 714 may cause an edge surface of top portion 716 to be substantially even or flush with an external surface of top portion 714.

Figure 10:
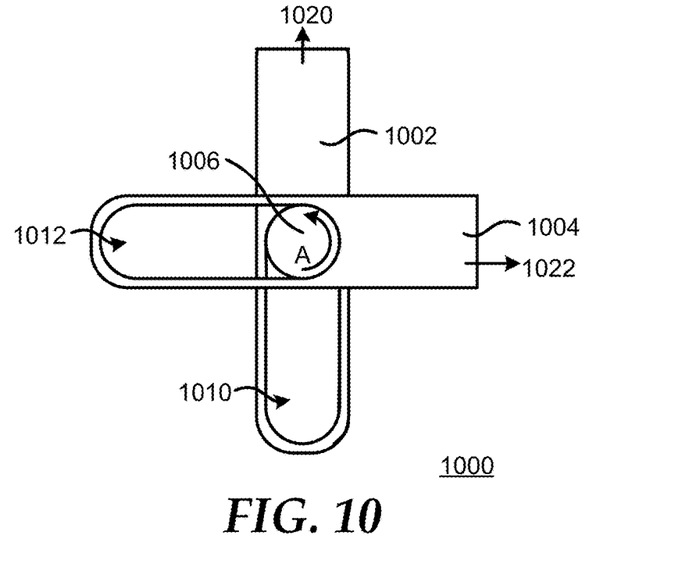
FIGS. 10-12 are diagrams of a sliding rack gear in different positions according to at least one embodiment of the present disclosure.
Figure 11:
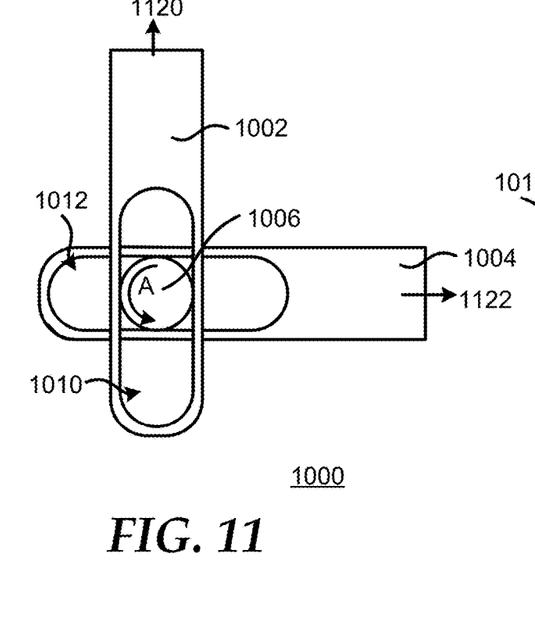
Figure 12:
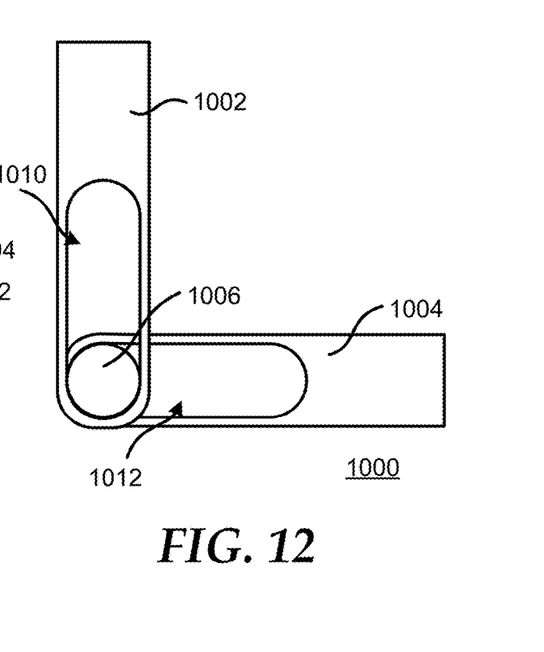

FIGS. 10-12 illustrate a sliding rack gear 1000 according to at least one embodiment of the present disclosure. Sliding rack gear 1000 includes a sliding halo mounts 1002 and 1004, and a gear 1006. Sliding halo mount 1002 includes a first end with a gear interface 1010, and a second end in physical communication with a halo of a display. Sliding halo mount 1004 includes a first end with a gear interface 1012, and a second end in physical communication with another halo of the display. Gear 1006 may be securely mounted within a display such that the gear may only rotate around an axis at the center of the gear and not move in any other direction with respect to the display.

In an example, a display, such as display 100 of FIG. 1, may include multiple sliding rack gears 1000. In this example, one sliding rack gear may be securely mounted to halos 106 and 108 of display 100 and another sliding rack gear 1000 may be securely mounted to halos 108 and 110 of the display in FIG. 1. As described with respect to FIGS. 10-12, sliding rack gear 1000 may enable two halos in a display to simultaneously move between a closed position and an open position. Thus, multiple halos, such as two side halos and a top halo, in a display may simultaneously transition between the closed and open position via one sliding halo mount being connected to one side halo and the top halo, and another sliding halo mount being connected to the other side halo and the top halo.

In an example, when gear 1006 is in physical communication with an inner most edge of gear interface 1010 of sliding halo mount 1002 and an inner most edge of gear interface 1012 of sliding halo mount 1004, sliding rack gear 1000 may be a closed position. In an example, the outer most portion of each of gear interfaces 1010 and 1012 may be determined as the portion of the gear interface that is nearest to the halo mounted on the corresponding sliding halo mount 1002 and 1004. When sliding rack gear 1000 is in the closed position, the sliding rack gear may cause halos of a display to also be in a closed position. Sliding rack gear 1000 may transition between the closed position and an open position in any suitable manner. For example, a force may be exerted on sliding halo mount 1002, and the force may cause the sliding halo mount to move in the direction of arrow 1020. In an example, the movement of sliding halo mount 1002 in the direction of arrow 1020 may cause gear 1006 to rotate in the direction of arrow A, which in turn may cause sliding halo mount 1004 to move in the direction of arrow 1022. In this example, the physical communication between gear interface 1010 and gear 1006 and the physical communication between gear interface 1012 and gear 1006 may cause sliding halo mounts 1002 and 1004 to move at substantially the same time.

Referring to FIG. 11, sliding rack gear 1000 is in an intermediate position, which in turn may cause halos of a display to also be in an intermediate position. When sliding rack gear 1000 is in the intermediate position, gear 1006 may in physical communication with any portion of gear interface 1010 of sliding halo mount 1002 and any portion of gear interface 1012 of sliding halo mount 1004. While sliding rack gear 1000 is in the intermediate position, a force may be exerted on sliding halo mount 1002, and the force may cause the sliding halo mount to move in the direction of arrow 1120. In an example, the movement of sliding halo mount 1002 in the direction of arrow 1120 may cause gear 1006 to rotate in the direction of arrow A, which in turn may cause sliding halo mount 1004 to move in the direction of arrow 1122. In this example, the physical communication between gear interface 1010 and gear 1006 and the physical communication between gear interface 1012 and gear 1006 may cause sliding halo mounts 1002 and 1004 to move at substantially the same time.

Referring to FIG. 12, sliding rack gear 1000 is in an open position, which in turn may cause halos of a display to also be in an open position. When sliding rack gear 1000 is in the intermediate position, gear 1006 may in physical communication with outer most portion of gear interface 1010 of sliding halo mount 1002 and outermost portion of gear interface 1012 of sliding halo mount 1004. In an example, the outer most portion of each of gear interfaces 1010 and 1012 may be determined as the portion of the gear interface that is furthest from the halo mounted on the corresponding sliding halo mount 1002 and 1004.

Figure 13:
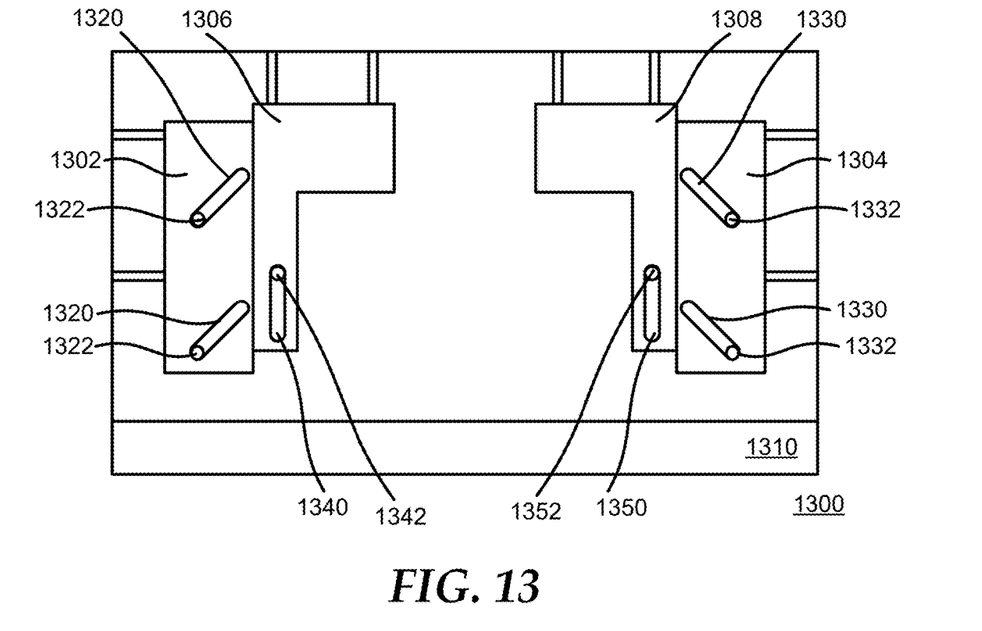
FIGS. 13-15 are diagrams of diagonal sliding rack gear of a display in different positions according to at least one embodiment of the present disclosure.
Figure 14:
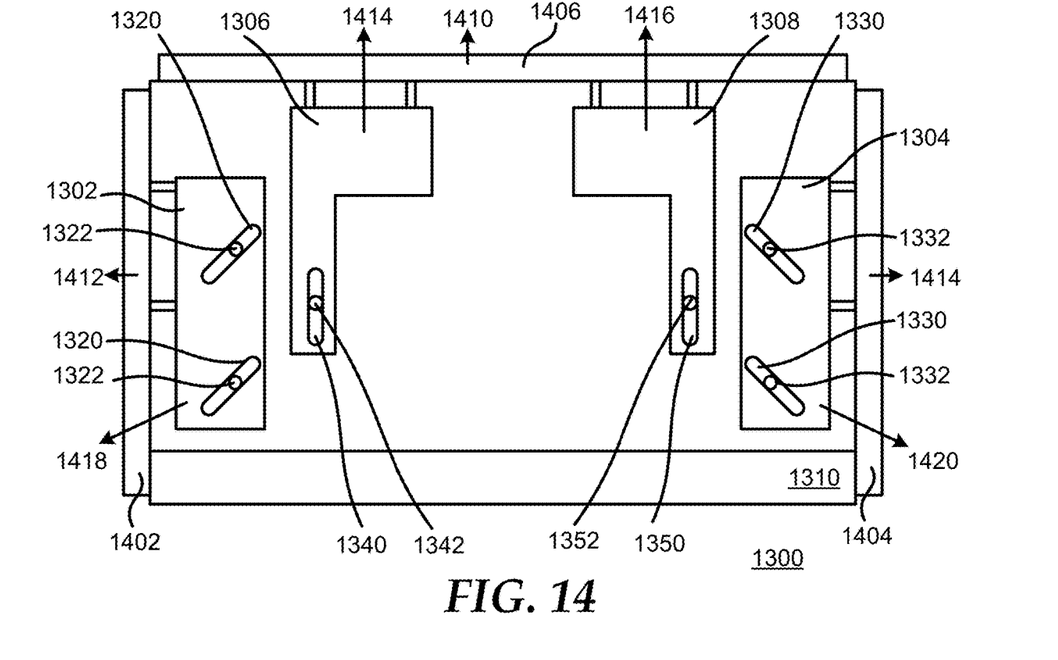
Figure 15:
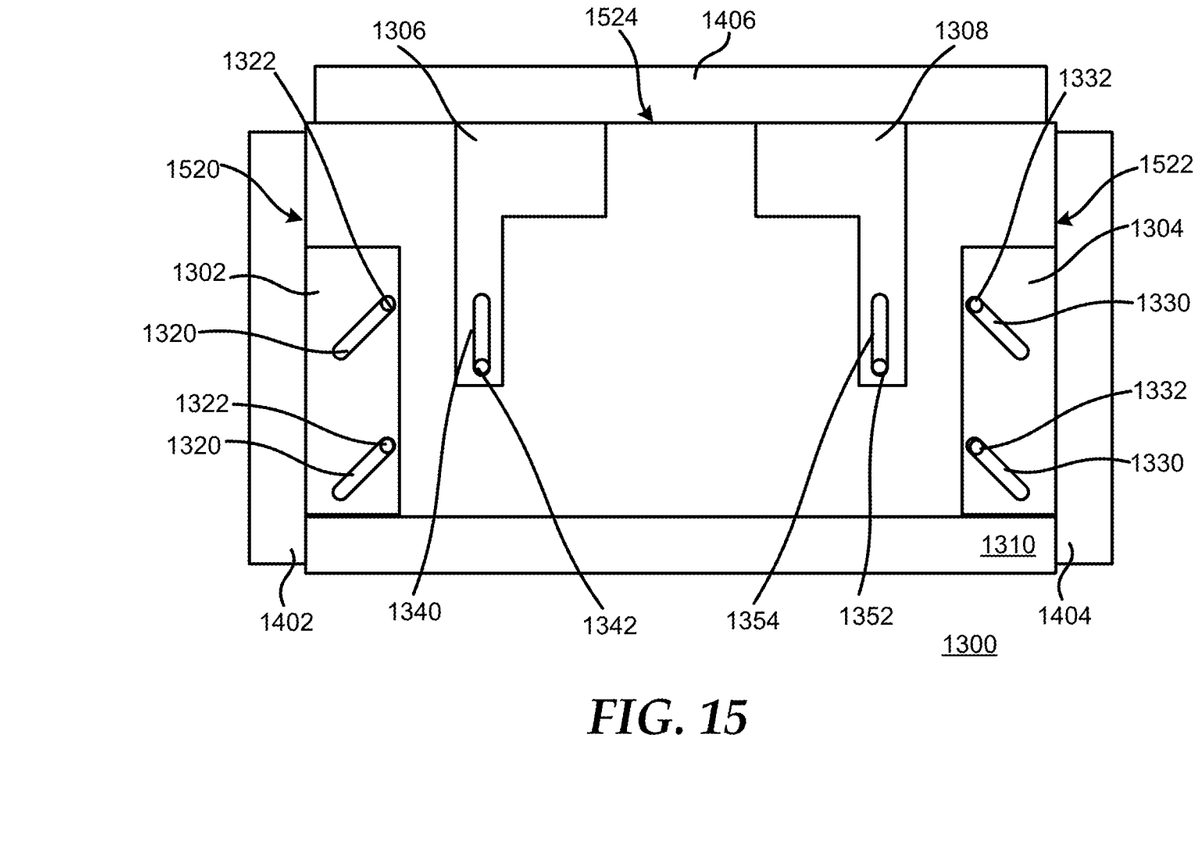

FIGS. 13-15 illustrates a cut away of a display 1300 at least one embodiment of the present disclosure. The cut away of display 1300 shows the components within the display with a rear surface of a rear portion removed. Display 1300 may be substantially similar to display 100 of FIG. 1. Display 1300 includes a diagonal sliding mounts 1302 and 1304, vertical sliding mounts 1306 and 1308, and a bottom section 1310. Diagonal sliding mount 1302 includes diagonal channels 1320, which are in physical communication with gears 1322. Diagonal sliding mount 1304 includes diagonal channels 1330, which are in physical communication with gears 1332. Vertical sliding mount 1306 includes a channel 1340, which is in physical communication with gear 1342. Vertical sliding mount 1308 includes a channel 1350, which is in physical communication with gear 1352. Gears 1322, 1332, 1342, and 1352 may be securely mounted within display 1300 such that each of the gears may only rotate around a corresponding axis at the center of the respective gear and not move in any other direction with respect to the display. Display 1300 may include additional components without varying from the scope of this disclosure.

Referring to FIG. 13, diagonal sliding mounts 1302 and 1304 and vertical sliding mounts 1306 and 1308 are in a closed position. When diagonal sliding mount 1302 is in the closed position, gears 1322 are in physical communication with an outer most edge of corresponding diagonal channels 1320 of the diagonal sliding mount. When diagonal sliding mount 1304 is in the closed position, gears 1332 are in physical communication with an outer most edge of corresponding diagonal channels 1330 of the diagonal sliding mount. When vertical sliding mount 1306 is in the closed position, gear 1342 is in physical communication with an inner most edge of channel 1340 of the vertical sliding mount. When vertical sliding mount 1308 is in the closed position, gear 1352 is in physical communication with an inner most edge of channels 1350 of the vertical sliding mount.

In an example, the outer most portion of each of channels 1330, 1340, and 1350 may be determined as the portion of the channel that is furthest to the halo mounted on the corresponding sliding mount 1302, 1304, 1306, and 1308. Additionally, the inner most portion of each of channels 1330, 1340, and 1350 may be determined as the portion of the channel that is nearest to the halo mounted on the corresponding sliding mount 1302, 1304, 1306, and 1308. When sliding mounts 1302, 1304, 1306, and 1306 are in the closed position, the sliding mounts may cause the halos of display 1300, such as halos 1402, 1404, and 1406 in FIG. 14, to also be in a closed position.

Referring to FIG. 14, in an example, halo 1402 may be connected on the surface of diagonal sliding mount 1302 not visible in FIGS. 13-15. One of ordinary skill in the art would recognize that halos 1402, 1404, and 1406 may connected to any suitable surface of respective sliding mounts 1302, 1304, and both 1306 and 1308 without varying from the scope of this disclosure. Sliding mounts 1302, 1304, and 1306 may transition between the closed position and an open position in any suitable manner. For example, a force may be exerted on halo 1406, and the force may cause the halo to move in the direction of arrow 1410. In an example, the movement of halo 1406 in the direction of arrow 1410 may cause halo 1402 to move in the direction of arrow 1412 and halo 1404 to move in the direction of arrow 1414. As halo 1406 moves in the direction of arrow 1410, vertical sliding mounts 1306 and 1308 may move in a substantially similar direction as identified by arrows 1414 and 1416. Similarly, as halo 1402 moves in the direction of arrow 1412, diagonal sliding mount 1302 may move in the direction of arrow 1418. As halo 1404 moves in the direction of arrow 1414, diagonal sliding mount 1304 may move in the direction of arrow 1420.

In an example, as sliding mounts 1306 and 1308 move in the direction of arrows 1414 and 1416, gear 1342 within channel 1340 and gear 1352 within channel 1350 may rotate. The physical communication between gear 1342 and channel 1340 may cause vertical sliding mount 1306 to move in the direction of arrow 1414, and the physical communication between gear 1352 and channel 1350 may cause vertical sliding mount 1308 to move in the direction of arrow 1416.

In an example, as sliding mount 1302 moves in the direction of arrow 1418, gears 1322 within channels 1320 may rotate. The physical communication between gears 1322 and channels 1320 may cause diagonal sliding mount 1302 to move in the direction of arrow 1418. In certain examples, the movement of diagonal sliding mount 1302 may enable halo 1402 to move at substantially the same time as halo 1406. In an example, as sliding mount 1304 moves in the direction of arrow 1420, gears 1332 within channels 1330 may rotate. The physical communication between gears 1332 and channels 1330 may cause diagonal sliding mount 1304 to move in the direction of arrow 1420. In certain examples, the movement of diagonal sliding mount 1304 may enable halo 1404 to move at substantially the same time as halos 1402 and 1406.

As shown in FIG. 14, sliding mounts 1302, 1304, and 1306 may be in an intermediate position, which in turn may hold halos 1402, 1404, and 1406 in an intermediate position. When sliding mount 1302 is in the intermediate position, gears 1322 may in physical communication with any portion of channels 1320. Similarly, when sliding mount 1304 is in the intermediate position, gears 1332 may in physical communication with any portion of channels 1330. When sliding mounts 1306 and 1308 are in the intermediate position, gear 1342 may in physical communication with any portion of channel 1340 and gear 1352 may in physical communication with any portion of channel 1350.

Referring to FIG. 15, halos 1402, 1404, and 1406 are in an open position, which in turn may cause sliding mounts 1302, 1304, 1306, and 1308 may also be in an open position. When halo 1402 is in open position, one edge of diagonal sliding mount 1302 may be in physical communication with an edge 1520 of display 1300 and another edge may be in physical communication with bottom section 1310. In an example, the physical communication between diagonal sliding mount 1302 and both edge 1520 of display 1300 and bottom section 1310 may hold halo 1402 in the open position. When sliding mount 1302 is in the open position, gears 1322 may be in physical communication with an inner surface of channels 1320.

In certain examples, when halo 1404 is in open position, one edge of diagonal sliding mount 1304 may be in physical communication with an edge 1522 of display 1300 and another edge may be in physical communication with bottom section 1310. In an example, the physical communication between diagonal sliding mount 1304 and both edge 1522 of display 1300 and bottom section 1310 may hold halo 1404 in the open position. When sliding mount 1304 is in the open position, gears 1332 may be in physical communication with an inner surface of channels 1330.

In an example, when halo 1406 is in open position, one edge of vertical sliding mount 1306 may be in physical communication with an edge 1524 of display 1300, and one edge of vertical sliding mount 1308 may be in physical communication with the same edge 1524 of the display. In an example, the physical communication between sliding mounts 1306 and 1380 and edge 1524 of display 1300 may hold halo 1406 in the open position. When sliding mount 1306 is in the open position, gear 1342 may be in physical communication with an inner surface of channels 1340. Similarly, when sliding mount 1308 is in the open position, gear 1354 may be in physical communication with an inner surface of channels 1350.

In certain examples, halos 1402, 1404, and 1406 and sliding mounts 1302, 1304, 1306, and 1308 may transition from the open position to the closed position at substantially the same time based on forces being exerted on halos 1402 and 1404 in an opposite direction as compared to the forces described above with respect to FIG. 13 above. In response to these forces, the interactions among halos 1402, 1404, and 1406 and sliding mounts 1302, 1304, 1306, and 1308 may enable a proper retraction of the halos within display 1300.

Figure 16:
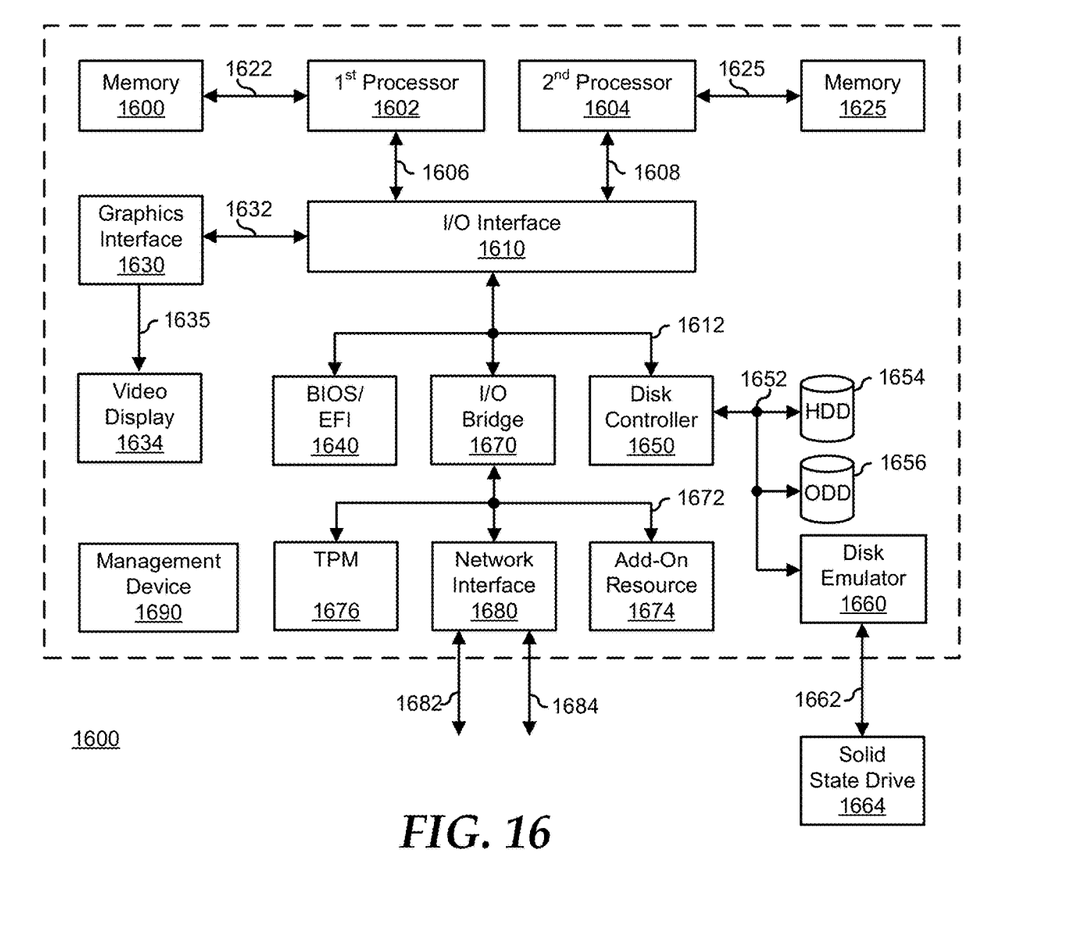
FIG. 16 is a block diagram of a general information handling system according to an embodiment of the present disclosure.

FIG. 16 shows a generalized embodiment of an information handling system 1600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1600 can include processing resources for executing machine-executable code, such as a central processing unit (CPU), a programmable logic array (PLA), an embedded device such as a System-on-a-Chip (SoC), or other control logic hardware. Information handling system 1600 can also include one or more computer-readable medium for storing machine-executable code, such as software or data. Additional components of information handling system 1600 can include one or more storage devices that can store machine-executable code, one or more communications ports for communicating with external devices, and various input and output (I/O) devices, such as a keyboard, a mouse, and a video display. Information handling system 1600 can also include one or more buses operable to transmit information between the various hardware components.

Information handling system 1600 can include devices or modules that embody one or more of the devices or modules described below and operates to perform one or more of the methods described below. Information handling system 1600 includes a processors 1602 and 1604, an input/output (I/O) interface 1610, memories 1620 and 1625, a graphics interface 1630, a basic input and output system/universal extensible firmware interface (BIOS/UEFI) module 1640, a disk controller 1650, a hard disk drive (HDD) 1654, an optical disk drive (ODD) 1656, a disk emulator 1660 connected to an external solid state drive (SSD) 1662, an I/O bridge 1670, one or more add-on resources 1674, a trusted platform module (TPM) 1676, a network interface 1680, a management device 1690, and a power supply 1695. Processors 1602 and 1604, I/O interface 1610, memory 1620, graphics interface 1630, BIOS/UEFI module 1640, disk controller 1650, HDD 1654, ODD 1656, disk emulator 1660, SSD 1662, I/O bridge 1670, add-on resources 1674, TPM 1676, and network interface 1680 operate together to provide a host environment of information handling system 1600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1600.

In the host environment, processor 1602 is connected to I/O interface 1610 via processor interface 1606, and processor 1604 is connected to the I/O interface via processor interface 1608. Memory 1620 is connected to processor 1602 via a memory interface 1622. Memory 1625 is connected to processor 1604 via a memory interface 1627. Graphics interface 1630 is connected to I/O interface 1610 via a graphics interface 1632 and provides a video display output 1636 to a video display 1634. In a particular embodiment, information handling system 1600 includes separate memories that are dedicated to each of processors 1602 and 1604 via separate memory interfaces. An example of memories 1620 and 1630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1640, disk controller 1650, and I/O bridge 1670 are connected to I/O interface 1610 via an I/O channel 1612. An example of I/O channel 1612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 1640 includes BIOS/UEFI code operable to detect resources within information handling system 1600, to provide drivers for the resources, initialize the resources, and access the resources. BIOS/UEFI module 1640 includes code that operates to detect resources within information handling system 1600, to provide drivers for the resources, to initialize the resources, and to access the resources.

Disk controller 1650 includes a disk interface 1652 that connects the disk controller to HDD 1654, to ODD 1656, and to disk emulator 1660. An example of disk interface 1652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1660 permits SSD 1664 to be connected to information handling system 1600 via an external interface 1662. An example of external interface 1662 includes a USB interface, an IEEE 3394 (Firewire) interface, a proprietary interface, or a combination thereof. Alternatively, solid-state drive 1664 can be disposed within information handling system 1600.

I/O bridge 1670 includes a peripheral interface 1672 that connects the I/O bridge to add-on resource 1674, to TPM 1676, and to network interface 1680. Peripheral interface 1672 can be the same type of interface as I/O channel 1612 or can be a different type of interface. As such, I/O bridge 1670 extends the capacity of I/O channel 1612 when peripheral interface 1672 and the I/O channel are of the same type, and the I/O bridge translates information from a format suitable to the I/O channel to a format suitable to the peripheral channel 1672 when they are of a different type. Add-on resource 1674 can include a data storage system, an additional graphics interface, a network interface card (NIC), a sound/video processing card, another add-on resource, or a combination thereof. Add-on resource 1674 can be on a main circuit board, on separate circuit board or add-in card disposed within information handling system 1600, a device that is external to the information handling system, or a combination thereof.

Network interface 1680 represents a NIC disposed within information handling system 1600, on a main circuit board of the information handling system, integrated onto another component such as I/O interface 1610, in another suitable location, or a combination thereof. Network interface device 1680 includes network channels 1682 and 1684 that provide interfaces to devices that are external to information handling system 1600. In a particular embodiment, network channels 1682 and 1684 are of a different type than peripheral channel 1672 and network interface 1680 translates information from a format suitable to the peripheral channel to a format suitable to external devices. An example of network channels 1682 and 1684 includes InfiniBand channels, Fibre Channel channels, Gigabit Ethernet channels, proprietary channel architectures, or a combination thereof. Network channels 1682 and 1684 can be connected to external network resources (not illustrated). The network resource can include another information handling system, a data storage system, another network, a grid management system, another suitable resource, or a combination thereof.

Management device 1690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 1600. In particular, management device 1690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 1600, such as system cooling fans and power supplies. Management device 1690 can include a network connection to an external management system, and the management device can communicate with the management system to report status information for information handling system 1600, to receive BIOS/UEFI or system firmware updates, or to perform other task for managing and controlling the operation of information handling system 1600.

Management device 1690 can operate off of a separate power plane from the components of the host environment so that the management device receives power to manage information handling system 1600 when the information handling system is otherwise shut down. An example of management device 1690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:
   a front panel;
   a rear portion; and
   first, second and third halos located between the front panel and the rear portion, each of the halos to transition between a closed position and an open position, wherein the first, second, and third halos are baffles, the first halo including:
   a dual lenticular surface to direct a bias light along the first halo; and
   a portion beyond the dual lenticular surface, the portion to receive the bias lighting from the dual lenticular surface, and reflect the bias lighting toward a front of the display.

2. The display of claim 1, further comprising a first sliding mount in physical communication with the first halo, the first sliding mount to guide the first halo during the transition of the first halo from the closed position to the open position.

3. The display of claim 1, wherein the first halo further comprises a top portion in physical communication with the portion of the first halo, when the first halo is in the closed position, the top portion is flush with a side surface of the front panel and a side surface of the rear portion.

4. The display of claim 1, wherein the halos transition between the closed position and the open position at the same time.

5. The display of claim 1, wherein a force exerted against the first halo causes the first halo to transition from the closed position to the open position.

6. The display of claim 5, wherein the first, second, and third halos are physical coupled together, and a movement of the first halo causes the second and third halos move at a same time as the first halo.

7. The display of claim 1, wherein the dual lenticular surface and the portion are both visible only when the first halo is in the open position.

8. The display of claim 1, wherein the first and third halos overlap opposite ends of the second halo when the halos are in the closed position.

9. A display for an information handling system, the display comprising:
   a front panel;
   a rear portion; and
   first, second and third halos located between the front panel and the rear portion, the first, second, and third halos being physical coupled to cause the first, second, and third halos to transition between a closed position and an open position at a same time, wherein the first, second, and third halos are baffles, the first halo including:
   a dual lenticular surface to direct a bias light along the first halo; and
   a portion beyond the dual lenticular surface, the portion to receive the bias lighting from the dual lenticular surface, and reflect the bias lighting toward a front of the display.

10. The display of claim 9, further comprising a first sliding mount in physical communication with the first halo, the first sliding mount to guide the first halo during the transition of the first halo from the closed position to the open position.

11. The display of claim 10, wherein the first halo further comprises a second sliding mount in physical communication with the second halo and the first sliding mount, the second sliding mount to guide the second halo during the transition of the second halo from the closed position to the open position.

12. The display of claim 9, wherein the first halo further comprises a top portion in physical communication with the portion of the first halo, when the first halo is in the closed position, the top portion is flush with a side surface of the front panel and a side surface of the rear portion.

13. The display of claim 9, wherein the halos transition between the closed position and the open position at the same time.

14. The display of claim 9, wherein the dual lenticular surface and the portion are both visible only when the first halo is in the open position.

15. The display of claim 9, wherein the first and third halos overlap opposite ends of the second halo when the halos are in the closed position.

16. A display for an information handling system, the display comprising:
   a front panel;
   a rear portion; and
   first, second and third halos located between the front panel and the rear portion, the first, second, and third halos coupled together to cause the first, second, and third halos to transition between a closed position and an open position at a same time, wherein the first, second, and third halos are baffles, wherein the first and third halos overlap opposite ends of the second halo when the halos are in the closed position, the first halo including:
   a dual lenticular surface to direct a bias light along the first halo;
   a portion beyond the dual lenticular surface, the portion to receive the bias lighting from the dual lenticular surface, and reflect the bias lighting toward a front of the display; and
   a top portion in physical communication with the portion of the first halo, when the first halo is in the closed position, the top portion is flush with a side surface of the front panel and a side surface of the rear portion.

17. The display of claim 16, further comprising a first sliding mount in physical communication with the first halo, the first sliding mount to guide the first halo during the transition of the first halo from the closed position to the open position.

18. The display of claim 17, wherein the first halo further comprises a second sliding mount in physical communication with the second halo and the first sliding mount, the second sliding mount to guide the second halo during the transition of the second halo from the closed position to the open position.

* * * * *